(Model.)

A. H. WELLINGTON
Vegetable Cutter.

No. 240,348.  Patented April 19, 1881.

Witnesses:
N. C. McArthur
Geo. R. Porter

Inventor:
Amos H. Wellington
per Chas. H. Fowler,
Attorney.

UNITED STATES PATENT OFFICE.

AMOS H. WELLINGTON, OF LEBANON, NEW HAMPSHIRE, ASSIGNOR OF ONE-HALF TO WILLIAM M. KENDALL, OF SAME PLACE.

VEGETABLE-CUTTER.

SPECIFICATION forming part of Letters Patent No. 240,348, dated April 19, 1881.

Application filed December 27, 1880. (Model.)

*To all whom it may concern:*

Be it known that I, AMOS H. WELLINGTON, a citizen of the United States, residing at Lebanon, in the county of Grafton and State of New Hampshire, have invented certain new and useful Improvements in Root-Cutters; and I do hereby declare that the following is a full, clear, and exact description of the same, reference being had to the annexed drawings, making a part of this specification, and to the letters and figures of reference marked thereon.

Figure 1:
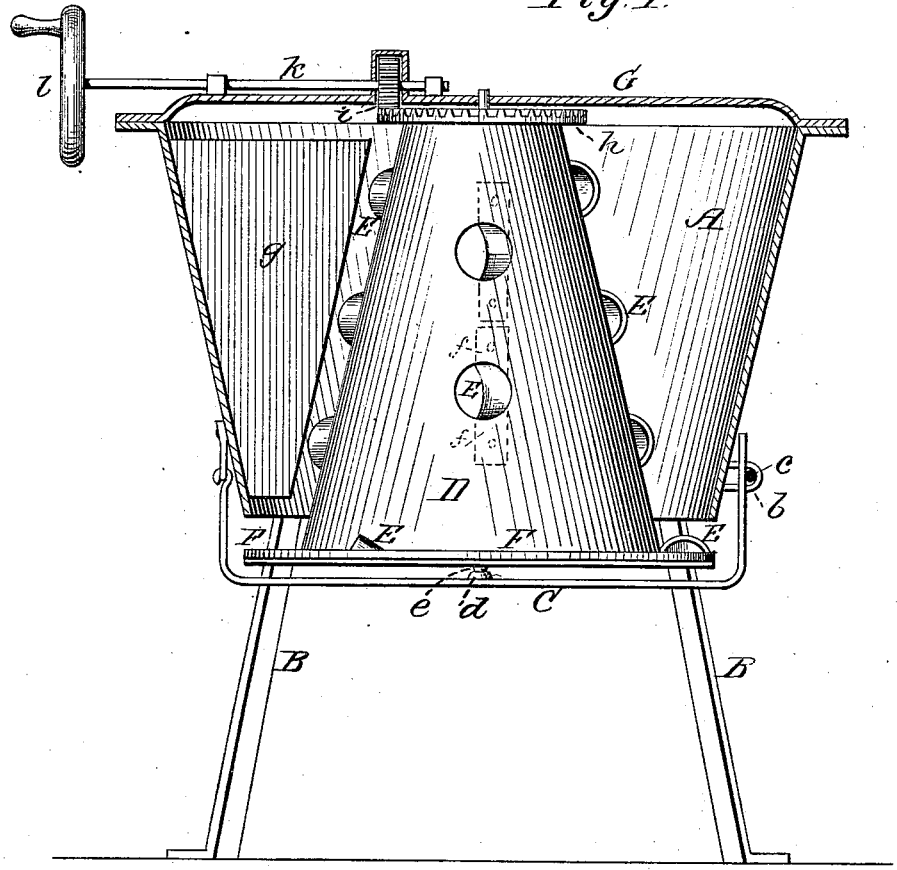
Figure 2:
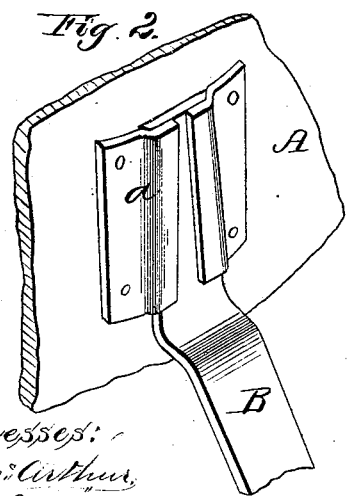
Figure 3:
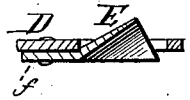

Figure 1 of the drawings is a side elevation of my invention, partly in section; Fig. 2, a detail view on an enlarged scale, showing the manner of connecting the detachable legs or supports; Fig. 3, a detail view, in section, showing the manner of attaching the cutter-knives to the revolving cylinder.

The present invention relates to certain new and useful improvements in that class of root or vegetable cutters in which a cylinder carrying knives is caused to horizontally rotate within a bucket or vessel into which is placed the vegetables or roots.

The invention consists in a vegetable or root cutter, constructed substantially as shown in the drawings, and hereinafter described, whereby a more perfectly-operating device is obtained, with less danger of the clogging or caking of the roots or vegetables at the bottom, between the revolving cutter and bucket or vessel, while the various parts of the device are greatly strengthened and less liable to get out of order.

In the accompanying drawings, A represents the bucket or vessel into which is placed the roots or vegetables. This vessel A is slightly tapering or decreasing in diameter from its top in a direction toward its bottom or lower end, and has tapering sleeves *a* to receive the legs or supports B, thereby admitting of said legs or supports being removed when required for packing and transporting.

To one side of the vessel A is hinged one end of a strap, C, which forms a bearing-plate and support for the cylinder D, both ends of the strap being bent at right angles.

To the side of the vessel A, and diametrically opposite the hinged end of the strap, is a staple, *b*, which passes through a slot in the free end of the strap, the latter being held thereto by a suitable key or pin, *c*.

Upon the upper side of the strap C is a step, *d*, to receive the end of an axial pivot, *e*, upon which the cylinder revolves.

The cylinder D is in the form of a frustum of a cone, or, in other words, its sides are inclined in an opposite direction from the vessel A, and has circular openings, through which project concavo-convex knives E. The lower end of the cylinder D projects a little below vessel A, and has a circumferential flange, F, which also has circular openings, with knives similar or like those of the cylinder. The knives E are connected to the cylinder D, by riveting or otherwise fastening them upon the inside of the cylinder, and having their cutting-edges project out through the circular openings, as is also the case with the knives upon the flange F, each knife having ears *f* for attaching it to the cylinder.

The circumferential flange F, carrying its knives, is of great importance to this class of revolving root or vegetable cutters, as without it the roots or vegetables would tend to cake at the bottom between the cylinder and vessel and clog up the device, which would impede the operation of cutting. This danger, however, is entirely obviated by the employment of the flange, as it keeps the roots or vegetables on a line below the partition *g* constantly in motion in addition to being acted upon by the knives on said flange.

The wing or partition *g* may be of the usual form, rigidly secured to the interior of the vessel A, its purpose being to prevent the roots or vegetables from slipping around with the cylinder while under the cutting operation, the roots or vegetables when cut sufficiently fine passing through the circular openings in the cylinder and flange into a suitable receptacle placed to receive them.

To the top of the cylinder D is a gear-wheel, *h*, rigidly secured thereto, and having vertical teeth to mesh with the teeth upon a pinion or small gear-wheel, *i*, upon a horizontal shaft, *k*.

A plate, G, passes diametrically across the vessel A, and its ends secured thereto, which forms a covering and protection to the gear-wheels, and also has bearings for the shaft *k*.

The balance-wheel or crank *l* may be provided with screw-threads to engage with the screw-threaded end of the shaft *k*, and in such case the threads should be so arranged upon both the wheel or crank and shaft that by turning the cylinder in the direction for cutting the roots or vegetables the wheel or crank will be screwed onto its place upon the shaft, and by holding the shaft stationary and turning the wheel or crank in an opposite direction it may be detached.

The several parts of the device may be made of any suitable metal; but I prefer it should be constructed of cast-iron, or cast-iron in combination with other metals.

Having now fully described my invention, what I claim as new, and desire to secure by Letters Patent, is—

1. In a root or vegetable cutter, the combination, with the vessel A, of the rotating cylinder D, having flange F, both cylinder and flange carrying knives E, substantially as and for the purpose set forth.

2. The cylinder D, with flange F and knives E, in combination with the vessel A, having plate G, hinged strap C, and detachable legs B, substantially as and for the purpose specified.

In testimony that I claim the above I have hereunto subscribed my name in the presence of two witnesses.

AMOS H. WELLINGTON.

Witnesses:
J. B. D. LEAVITT,
E. J. DURANT.